(12) United States Patent
Djordjevic et al.

(10) Patent No.: US 9,479,285 B2
(45) Date of Patent: Oct. 25, 2016

(54) NON-BINARY LDPC CODED MODE-MULTIPLEXED FOUR-DIMENSIONAL SIGNALING BASED ON ORTHOGONAL FREQUENCY DIVISION MULTIPLEXING

(71) Applicant: NEC Laboratories America, Inc., Princeton, NJ (US)

(72) Inventors: Ivan B. Djordjevic, Tucson, AZ (US); Ting Wang, West Windsor, NJ (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 14/513,671

(22) Filed: Oct. 14, 2014

(65) Prior Publication Data

US 2015/0104168 A1 Apr. 16, 2015

Related U.S. Application Data

(60) Provisional application No. 61/890,455, filed on Oct. 14, 2013.

(51) Int. Cl.
*H03M 13/00* (2006.01)
*H03M 13/05* (2006.01)
(Continued)

(52) U.S. Cl.
CPC ............. *H04J 14/04* (2013.01); *H04B 7/10* (2013.01); *H04L 1/0041* (2013.01);
(Continued)

(58) Field of Classification Search
CPC ............ H04J 14/04; H04L 25/0224; H04L 27/2627; H04L 27/2649
USPC ............................................ 398/44, 43, 42
See application file for complete search history.

(56) References Cited

U.S. PATENT DOCUMENTS 7,424,662 B2 * 9/2008 Eroz ...................... H04L 27/36
375/261
8,539,304 B1 * 9/2013 Shirali .................. H03M 13/116
714/758

(Continued)

OTHER PUBLICATIONS

Djordjevic ["Four-dimensional optical multiband-OFDM for beyond 1.4 Tb/s serial optical transmission", Jan. 17, 2011 / vol. 19, No. 2 / Optics Express 876].*

(Continued)

*Primary Examiner* — Oommen Jacob
(74) *Attorney, Agent, or Firm* — Joseph Kolodka

(57) ABSTRACT

Systems and methods for encoding streams of input data using at least two nonbinary low density parity check (NB-LDPC) encoders; generating NB-LDPC coded optimum signal constellations; performing orthogonal frequency division multiplexing (OFDM) on the NB-LDPC coded four-dimensional (4-D) optimum signal constellations; generating signals using mappers, the mappers configured to assign bits of signals to the signal constellations and to associate the bits of the one or more signals with signal constellation points. Output of the 4-D mappers is modulated using a 4-D OFDM transmitter and a 4-D modulator onto a transmission medium using block coded-modulation, and the modulated output is transmitted by mode-multiplexing independent 4-D OFDM data streams onto fiber. The transmitted modulated output is received, mode-demultiplexed, and demodulated using polarization diversity receivers, one per spatial mode, channel estimation and compensation methods are performed to overcome impairments in the transmission medium; and received data is decoded using non-binary decoders.

14 Claims, 3 Drawing Sheets

(51) Int. Cl.

| | |
|---|---|
| *H04J 14/04* | (2006.01) |
| *H04L 1/00* | (2006.01) |
| *H04L 27/26* | (2006.01) |
| *H04L 25/02* | (2006.01) |
| *H04B 7/10* | (2006.01) |
| *H04L 5/00* | (2006.01) |

(52) U.S. Cl.
CPC .......... *H04L 1/0057* (2013.01); *H04L 1/0058* (2013.01); *H04L 5/0026* (2013.01); *H04L 25/0224* (2013.01); *H04L 27/2627* (2013.01); *H04L 27/2634* (2013.01); *H04L 27/2649* (2013.01); *H04L 25/022* (2013.01); *H04L 25/0256* (2013.01)

(56) References Cited

U.S. PATENT DOCUMENTS

| | | | | |
|---|---|---|---|---|
| 8,656,244 | B1* | 2/2014 | Chang ............... | H03M 13/1171 714/752 |
| 2010/0275093 | A1* | 10/2010 | McLaughlin ....... | H03M 13/033 714/752 |
| 2010/0329671 | A1* | 12/2010 | Essiambre .............. | G02B 6/14 398/44 |
| 2011/0029845 | A1* | 2/2011 | Zhou .................. | H03M 13/1171 714/776 |
| 2012/0027418 | A1* | 2/2012 | Secondini ......... | H04L 25/03133 398/158 |
| 2012/0134446 | A1* | 5/2012 | Zhou .................. | H03M 13/655 375/320 |
| 2012/0250805 | A1* | 10/2012 | Shin ..................... | H04L 1/0054 375/341 |
| 2012/0263251 | A1* | 10/2012 | Djordjevic ........... | H04L 1/0042 375/261 |
| 2012/0263466 | A1* | 10/2012 | Djordjevic .......... | H04L 27/2096 398/65 |
| 2014/0199066 | A1* | 7/2014 | Martelli ............. | H04B 10/2581 398/44 |
| 2015/0104168 | A1* | 4/2015 | Djordjevic ............ | H04J 14/04 398/44 |

OTHER PUBLICATIONS

Djordjevic ["Generalized OFDM (GOFDM) for ultra high speed optical transmission" Optics Express Mar. 28, 2011, vol. 19, No. 7].*

Lin ["Nonbinary LDPC Coded Mode-Multiplexed Coherent Optical OFDM1.28Tbit/s 16QAM Signal Transmission Over 2000 km of Few-Mode-Fibers With Mode-Dependent Loss" IEEE Photonics vol. 4, No. 5].*

Lin abstract/BIB data.*

Ryf, et al., "32-bit/s/Hz Spectral Efficiency WDM Transmission over 177-km Few-Mode Fiber," OFC/NFOEC Postdeadline Papers, Mar. 2013, 3 Pages.

Li, et al., "146λ×6×19-Gbaud Wavelength- and Mode-division Multiplexed Transmission Over 10×50-km Spans of Few-Mode Fiber with a Gain-equalized Few-mode EDFA," OFC/NFOEC, Postdeadline Papers, Mar. 2013, 3 Pages.

Chen, et al., "Equalization of Two-Mode Fiber Based MIMO Signals with Larger Receiver Sets," Optics Express, vol. 20, No. 26, Nov. 2012, pp. B413-B418.

Qian, et al., "30Tb/s C- and L-bands Bidirectional Transmission Over 10,181km with 121km Span Length," Optics Express vol. 21, No. 12, Jun. 2013, pp. 14244-14250.

Lin, et al., "Non-binary LDPC Coded Mode-Multiplexed Coherent Optical OFDM 1.28 Tbit/s 16-QAM Signal Transmission Over 2000-km of Few-mode Fibers with Mode Dependent Loss," IEEE Photonics Journal, vol. 4, No. 5, Oct. 2012, pp. 1922-1929.

Djordjevic, et al., "On the Multidimensional Signal Constellation Design for Few-Mode Fiber Based High-speed Optical Transmission," IEEE Photonics Journal, vol. 4, No. 5, Oct. 2012, pp. 1325-1332.

Mumtaz, et al., "Nonlinear Propagation in Multimode and Multicore Fibers: Generalization of the Manakov Equations," Journal of Lightwave Technology, vol. 31, No. 3, Feb. 2013, pp. 398-406.

\* cited by examiner

NON-BINARY LDPC CODED MODE-MULTIPLEXED FOUR-DIMENSIONAL SIGNALING BASED ON ORTHOGONAL FREQUENCY DIVISION MULTIPLEXING

RELATED APPLICATION INFORMATION

This application claims priority to provisional application Ser. No. 61/890,455 filed on Oct. 14, 2013, incorporated herein by reference.

BACKGROUND

1. Technical Field

The present invention relates to coded modulation and more particularly to non-binary low-density parity-check (NB-LDPC) mode-multiplexed four-dimensional signaling based on orthogonal frequency division multiplexing (OFDM).

2. Description of the Related Art

Due to the rapid growth of data-centric services and the general deployment of broadband access networks in recent years, there has been an elevated demand driving the dense wavelength division multiplexing (DWDM) network upgrade from 10 Gb/s per channel to more spectrally-efficient channel transmission rates (e.g., 40 Gb/s, 100 Gb/s, and beyond). However, as the symbol rate increases, the deteriorating effects of linear and nonlinear fiber impairments are known to exacerbate. For example, as the communication rate over a given medium increases, transmission becomes increasingly sensitive to errors due to various linear and nonlinear channel impairments such as chromatic dispersion, PMD and fiber nonlinearities. The Shannon limit for a noise-influenced channel describes a maximum amount of error-free data that can be transmitted with a specified bandwidth—it is therefore helpful to have robust codes and modulation schemes that closely approach the Shannon limit without imposing high requirements in terms of implementation cost and complexity.

Bit interleaved (BI) low-density parity-check (LDPC) coded modulation (CM) based on large girth LDPC codes provides excellent performance, but requires code rate and bandwidth to increase in order to compensate for information loss due to coding. Meanwhile, quasi-cyclic (QC) LDPC codes are easy to implement, but this comes at the expense of performance. Large-girth QC-LDPC codes provide good bit-error rate (BER) performance, but require excessive codeword length for larger girths, as the code rate, and therefore the bandwidth, must increase to compensate for information loss due to coding. Another approach to resolve channel impairments is to employ advanced techniques in modulation, detection, coding, and signal processing. For example, space division multiplexing has been employed to achieve multi-Tb/s serial optical transport over few-mode-fibers (FMF). However, there exist additional channel impairments in FMFs that do not exist in single-mode-fibers (SMF). These impairments (e.g., linear and non-linear coupling among spatial modes) provide an additional challenge to serial multi-terabit long-haul transmissions.

SUMMARY

A method for data transport, including encoding one or more streams of input data using at least two nonbinary low density parity check (NB-LDPC) encoders; generating one or more NB-LDPC coded four-dimensional (4-D) optimum signal constellations; performing orthogonal frequency division multiplexing (OFDM) on the NB-LDPC coded 4D optimum signal constellations; generating one or more signals using two or more mappers, the mappers configured to assign bits of one or more signals to the signal constellations and to associate the bits of the one or more signals with signal constellation points; and modulating the output of the 4-D mappers using a 4-D OFDM transmitter and a 4-D modulator onto a transmission medium using block coded-modulation, and transmitting modulated output of the mappers using the transmission medium; mode-multiplexing independent 4-D OFDM data streams onto fiber.

A system for transmitting data, including two or more nonbinary low density parity check (NB-LDPC) encoders configured to encode one or more streams of input data; one or more orthogonal frequency division multiplexers configured to perform orthogonal frequency division multiplexing (OFDM) on one or more NB-LDPC coded four-dimensional (4-D) optimum signal constellations; two or more mappers configured to generate one or more signals, assign bits of the one or more signals to the one or more NB-LDPC coded 4-D optimum signal constellations, and associate the bits of the one or more signals with signal constellation points, and one or more 4-D modulators configured to modulate output of the two or more mappers by a 4-D OFDM transmitter and a 4-D modulator onto a transmission medium using block coded-modulation, and to transmit the modulated output of the two or more mappers using the transmission medium.

A system for receiving data, including one mode-demultiplexer; one four-dimensional (4-D) or two two-dimensional (2-D) orthogonal frequency division mode demultiplexers configured to receive and demodulate the signal at the output of mode-demultiplexer; one 4-D or two 2-D, per mode, orthogonal frequency division multiplexing (OFDM) demodulators per mode, the OFDM demodulators configured to demodulate the received mode-demultiplexer signal; one or more channel estimators and compensators configured to perform channel estimation and compensation methods to overcome linear and non-linear impairments in the transmission medium using pilots; and two or more nonbinary decoders configured to decode received data These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
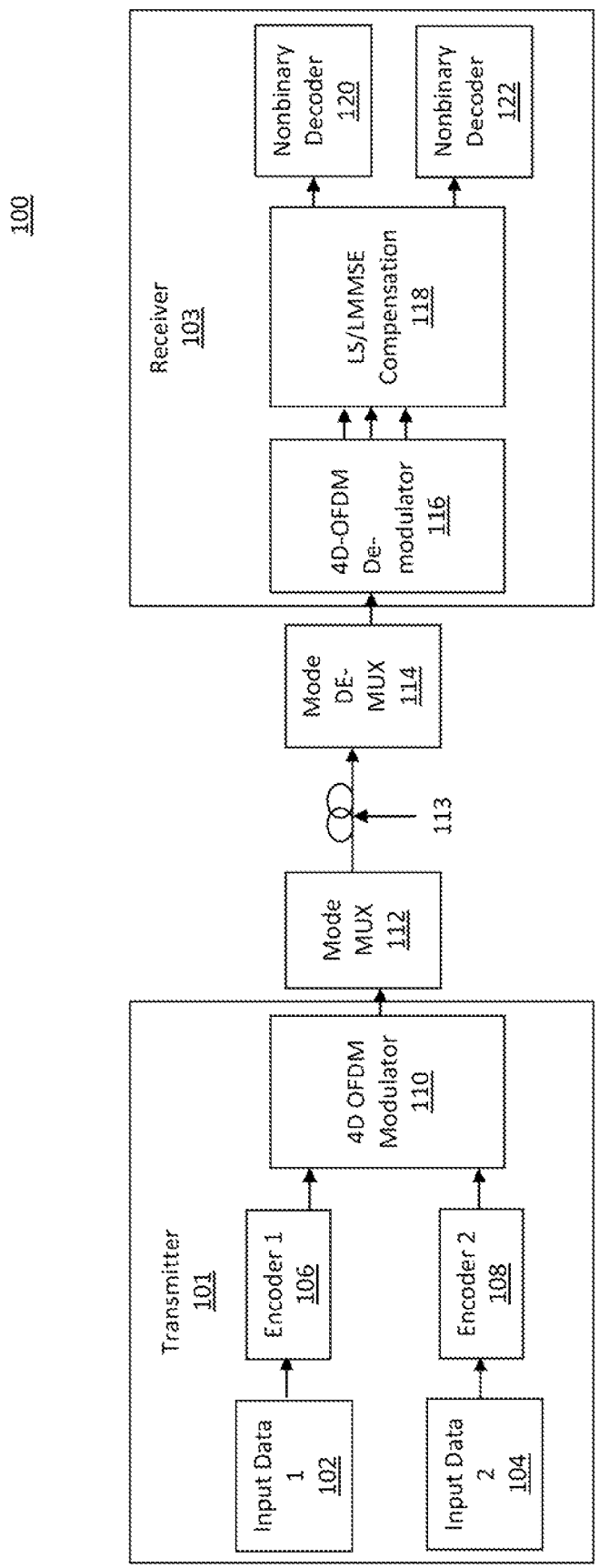
FIG. 1 is a block/flow diagram illustrating a high-level system/method for data transport that employs non-binary low-density parity-check (NB-LDPC) mode-multiplexed four-dimensional signaling based on orthogonal frequency division multiplexing (OFDM) in accordance with the present principles.

In accordance with the present principles, systems and methods are provided to enable ultra-high speed serial optical transport that may employ commercially available equipment operating at lower speed by employing non-binary low-density parity-check (NB-LDPC) mode-multiplexed four-dimensional signaling based on orthogonal frequency division multiplexing (OFDM). The present system/method may enable ultra-high speed (e.g. multi Tb/s and beyond) serial optical transport over fiber (e.g., few-mode-fiber (FMF), single-mode-fiber (SMF)) by employing mode-multiplexed NB-LDPC coded optimum signal constellations (e.g., 4-dimensional (4D)), combined with orthogonal frequency division multiplexing (OFDM). Block coded modulation with advanced channel estimation and compensation techniques (e.g., linear minimum mean square error (LMMSE)-based compensation of mode coupling) may be employed to overcome constraints imposed by linear and nonlinear impairments in fiber (e.g., FMF) according to one embodiment of the present principles.

In one embodiment, the present principles may be employed for both SMF and FMF, and the ODPC-coded OSCD constellations employed according to the present principles may include better tolerance to the residual mode coupling and non-linear interaction of spatial modes as compared to conventional quadrature amplitude modulation (QAM) methods.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a high-level system/method for data transport that employs non-binary low-density parity-check (NB-LDPC) coded mode-multiplexed four-dimensional signaling based on orthogonal frequency division multiplexing (OFDM) in accordance with one embodiment of the present principles. It is noted that for illustrative purposes, the system configuration corresponding to one spatial mode and one OFDM band is fully shown.

In one embodiment, an optical communication system 100 is illustratively depicted comprising a transmitter 101 and a receiver 103. Although the transmitter 101 and the receiver 103 are both illustratively shown, one skilled in the art would appreciate that the transmitter 101 or receiver 103 may each be employed separately, or in combination with each other in accordance with the present principles. In an illustrative embodiment, the details corresponding to either fundamental mode in SMF or one spatial mode in FMF are provided. FMFs are defined as optical fibers that support more than one spatial mode, but fewer spatial modes than conventional multi-mode fibers. While the details corresponding to either fundamental mode in SMF or one spatial mode in FMF are illustratively provided, it is contemplated that other modes may also be employed (e.g., few-core fiber, few-mode-few-core fiber, or multi-mode fiber).

In one embodiment, the transmitter 101 may receive input data including two or more data streams 102, 104 from different information sources. The two or more data streams may each operate at high speeds (e.g., 40 Giga symbols/second (SG/s) in effective information symbol rate), and may be encoded by one or more encoders 106, 108 (e.g., non-binary LDPC encoders (e.g., 16-ary)). One or more modulators 110 (e.g., 4-Dimensional (4D) Optimum Signal Constellation Design (OSCD) based 4-D Orthogonal Frequency Division Multiplexing (OFDM) transmitter followed by 4-D modulator) may be employed to receive the symbols (e.g., non-binary) from the encoders 106, 108, and may map the symbols to the corresponding constellation points (e.g., 16-ary OSCD constellation points).

In one embodiment the 4D-OSCD OFDM modulator 110 may include one or more 4D-OSCD mappers (e.g., which outputs 4D coordinates of corresponding 4D constellation), two or more OFDM transmitters (e.g., corresponding to x- and y-polarizations), and one or more 4D modulators (which may include one laser diode, one polarization-beam splitter, two in-phase/quadrature (I/Q) modulators, and polarization beam combiners per 4-D modulator (not shown)). The first two/second two coordinates of 4D constellations may be employed as inputs of one OFDM transmitters corresponding to x-polarization/y-polarization, and may be polarization-multiplexed, first by using polarization beam combiner (PBC), which is a part of 4D-OFDM modulator 110, and may be then mode-multiplexed by a multiplexer 112, and transmitted over fiber 113 (e.g., FMF). Alternatively, a single 4-D OFDM transmitter can be used instead of two OFDM transmitters (that correspond to x- and y-polarizations).

Multiple 4D-OFDM streams may be incident to the mode-multiplexer 110. A de-multiplexer 114 may mode de-multiplex the 4D-OFDM signals, which may be demodulated in block 116. It is noted that in one embodiment, the 4D-OFDM demodulator 116 may include a polarization-diversity coherent detection receiver and two OFDM receivers, corresponding to x- and y-polarizations (not shown). Alternatively single 4-D OFDM receiver can substitute two OFDM receivers (that correspond to both polarization states). To compensate for mode crosstalk, pilot symbols may be properly inserted for compensation algorithms (e.g., Least Square (LS)-based, Linear Minimum Mean Square Error (LMMSE)-based compensation algorithms) in block 118. The symbols may then be sent to one or more Decoders 120, 122 (e.g., NB-LDPC decoders).

It is noted that to evaluate the present principles pulse propagation in FMF may be modeled by a nonlinear Schrodinger equation, which may consider both the linear and nonlinear effects in FMF. The equation may include the impact of attenuation, chromatic dispersion, self-phase modulation (SPM), and cross-mode-phase modulation (XMPM). To compensate for the loss from FMF, few-mode-Erbium Doped Fiber Amplifiers (EDFAs) may be periodically deployed. The mode-demultiplexing and coherent detection may be performed at the receiving side, followed by the OFDM receiver in one embodiment.

In one embodiment, NB-LDPC codes constructed over higher order Galois fields (GF) may be employed. The NB-LDPC codes may be efficiently decoded using a Fast Fourier Transform (FFT). Thus, in one embodiment, for long-haul transmission over FMF, high-rate non-binary regular quasi-cyclic (QC) LDPC codes may be employed as they have highly regular structure in their parity-check matrices, which facilitates hardware decoder implementations.

It is noted that although the above configuration has been illustratively depicted according to one embodiment, other sorts of configurations for systems/methods for data transport may also be employed according to the present principles.

Figure 2:
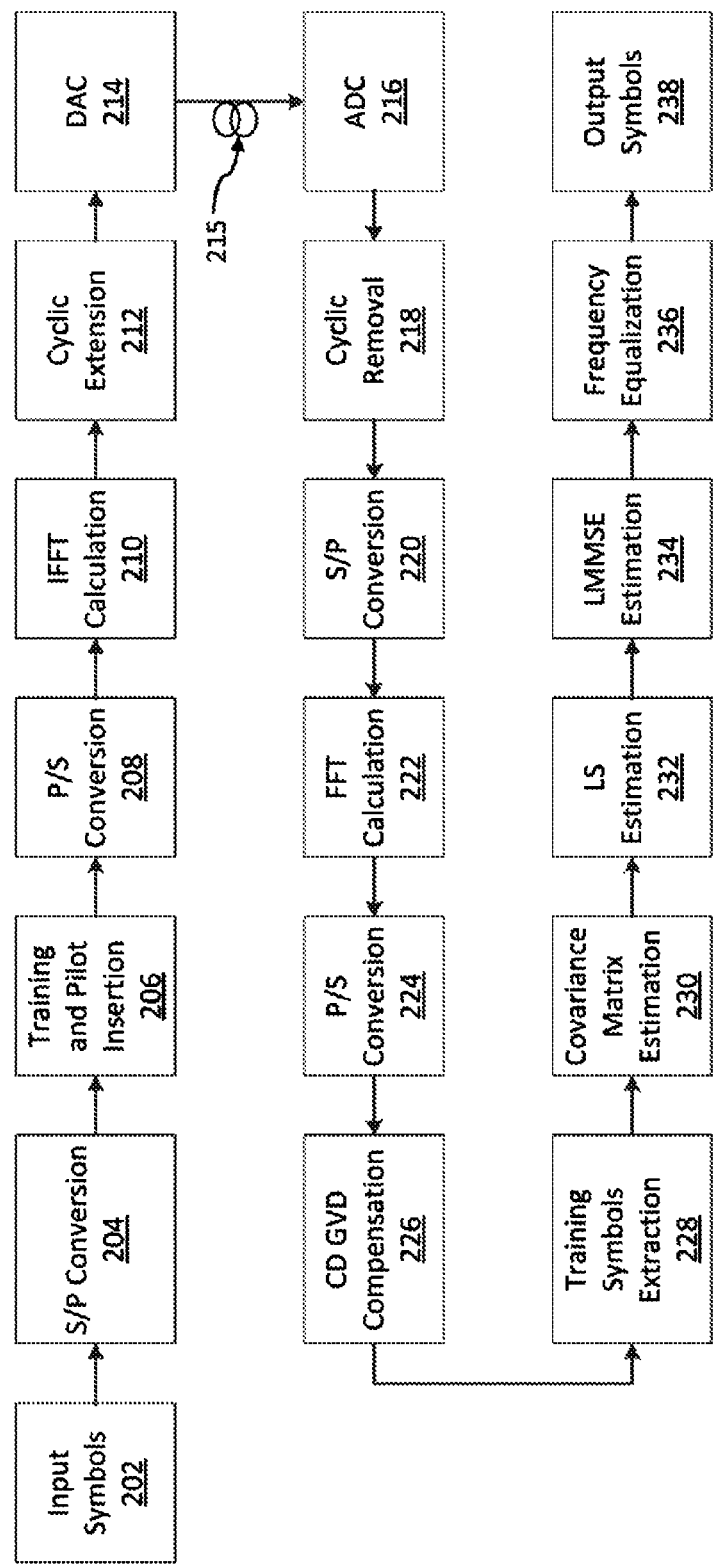
FIG. 2 is a block/flow diagram illustrating a system/method for data transport that employs a single-band OFDM transmitter configuration to transmit non-binary low-density parity-check (NB-LDPC)-coded signals over multiple spatial modes in accordance with the present principles.

Referring now to FIG. 2, a system/method for data transport that employs a single-band OFDM transmitter configuration to transmit non-binary low-density parity-check (NB-LDPC)-coded signals over four spatial modes is illustratively depicted in accordance with the present principles. It is noted that for illustrative purposes, the block diagram of OFDM subsystem corresponding to one spatial mode and one polarization state is shown. In one embodiment, symbols may be input in block 202. It is noted that in the case of multiple OFDM bands, each appropriately centered within a desired bandwidth, spectral multiplexing may be performed before mode-multiplexing is performed. For 4D signaling, two OFDM transmitters may be employed for each 4D constellation, as discussed above. After passing through a NB-LDPC encoder, input symbols may be sent to a 4D-orthogonal signal constellation design (OSCD) demapper. The first two coordinates may be allocated to the first OFDM transmitter, and the second two coordinates may be mapped to the second OFDM transmitter.

In one embodiment, the signals may undergo serial-to-parallel conversion in block 204 to generate symbols (e.g., OFDM symbols) including subcarriers (e.g., 2048). Training symbols and pilots may be inserted into the OFDM symbols for channel estimation purposes in block 206. Parallel-to-serial conversion may be performed in block 208, which may be followed by two inverse Fast Fourier Transform (FFT) blocks 210 (only one shown) corresponding to x- and y-polarizations, two cyclic extension blocks 210, two digital-to-analog conversion (DACs) in block 214 followed by polarization-beam combiner, and data may be transmitted over fiber 215 (e.g., SMF, FMF). In one embodiment, the length of the guard interval may be chosen to be longer than the total signal spread due to mode dispersion.

In one embodiment, the OFDM receiver may perform essentially the same operations of the transmitter in the reverse order. Data may be received over the fiber 215, and after mode-division demultiplexing followed by a polarization receiver, the analog-to-digital conversion (ADC) may be performed in block 216. The receiver may perform cyclic removal 218, serial-to-parallel conversion 220, FFT calculation 222, and parallel-to-serial conversion 224. Chromatic dispersion group velocity dispersion (CD GVD) may be performed in block 226, training symbols may be extracted in block 228, and covariance matrix estimation may be performed in block 230. It is noted that both the least-square (LS) and LMMSE channel estimation procedures may be applied in blocks 232 and 234, and may be followed by channel interpolation based on piece-wise linear interpolation. Frequency equalization may be performed in block 236, and symbols may be output in block 238.

In one embodiment, the channel estimation may be performed by inserting pilot tones into all of the subcarriers of OFDM frames with a specific insertion period. The representation of channel coefficients of pilot subcarriers for the minimum mean square error (MMSE), denoted as $\hat{H}_{p,LMMSE}$, estimator may be given by the following method:

$$\hat{H}_{p,LMMSE} = R_{H_p,H_p}\left(R_{H_p,H_p} + \frac{\xi}{SNR_p}I\right)^{-1}\hat{H}_{p,LS}, \quad (1)$$

where $\hat{H}_{p,LS}$ is the least-square estimate of $H_p$, and may be determined as follows:

$$\hat{H}_{p,LS} = [H_{p,LS}(0), H_{p,LS}(1), \ldots H_{p,LS}(N_p - 1)]^T = \quad (2)$$
$$\left[\frac{Y_p(0)}{X_p(0)}, \frac{Y_p(1)}{X_p(1)}, \ldots, \frac{Y_p(N_p-1)}{X_p(N_p-1)}\right]^T,$$

where $X_p(i)$ and $Y_p(i)$ may be the transmitted and received symbols of pilot i (i=0, 1, . . . , $N_p$−1). It is noted that the subscript p is used to denote pilot.) In Equation (I), $SNR=E\{|X_p(k)|^2\}/\sigma_n^2$ may denote the signal-to-noise ratio (SNR) for each mode estimated after LS compensation, and $\xi=E\{|X_p(k)|^2\}E\{|1/X_p(k)|^2\}$ may be a constant dependent on a signal constellation, while the covariance matrix may be defined as $R_{H_p,H_p}=E\{H_p H_p^H\}$, where E may denote the expectation operator and H may denote a Hermitian transposition operation. By transmitting sufficiently long (e.g., to achieve a given accuracy) training OFDM frame sequences before data OFDM frames, the covariance matrix may be estimated in block 230.

For illustrative purposes, to analyze the performance of one embodiment of the present principles, the propagation of the mode-multiplexed OFDM signals over an FMF link by applying a Monte Carlo simulation may be employed. An Eigen library and multi-thread technology in C++ may be deployed to reduce simulation time. The aggregate data rate per OFDM band, when 4D-16-ary OSCD is used, is 320 Gb/s [50(GS/s)*4(16OSCD)*2(modes)*0.8(code rate)]. With four OFDM bands, a serial data rate of 1.28 Tb/s may be achieved. The number of subcarriers of OFDM may be set to 2048 with 1919 data positions and 129 pilot positions. The FFT/IFFT length may be 4096 in both QPSK and 16 ary OSCD cases. The LDPC codeword length is 16935 for both nonbinary and binary cases and the code rate is 0.8 with column-weight three and girth ten.

In one embodiment, in a case where a first two and a second two coordinates are observed separately, it may show 4D-OSCD constellations for different differences with/without LS/LMMSE compensation. In simulations, two spatial modes, each including two polarization states, may be observed, and due to random mode-coupling, the symbols may not be recognized without compensation. In one embodiment, the LS method may be employed for shorter distances (e.g., less than 2,000 km) with lower complexity, and the LMMSE method may be employed for longer distances (e.g., greater than 2,000 km) with higher complexity. The overall improvement NB-LDPC coded 4D 16-ary OSCD over binary LDPC polarization-division multiplexed (PDM) quadrature phase shift keying (QPSK) may be 1,500 km (e.g., at a bit-error-rate (BER) of $10^{-4}$). In the case where 4D 16-ary OSCD is employed with the LMMSE method, the transmission distance of PDM QPSK may be extended by, for example, 300 km, and the overall BER performance may be obtained by averaging over both all spatial modes and OFDM bands.

Figure 3:
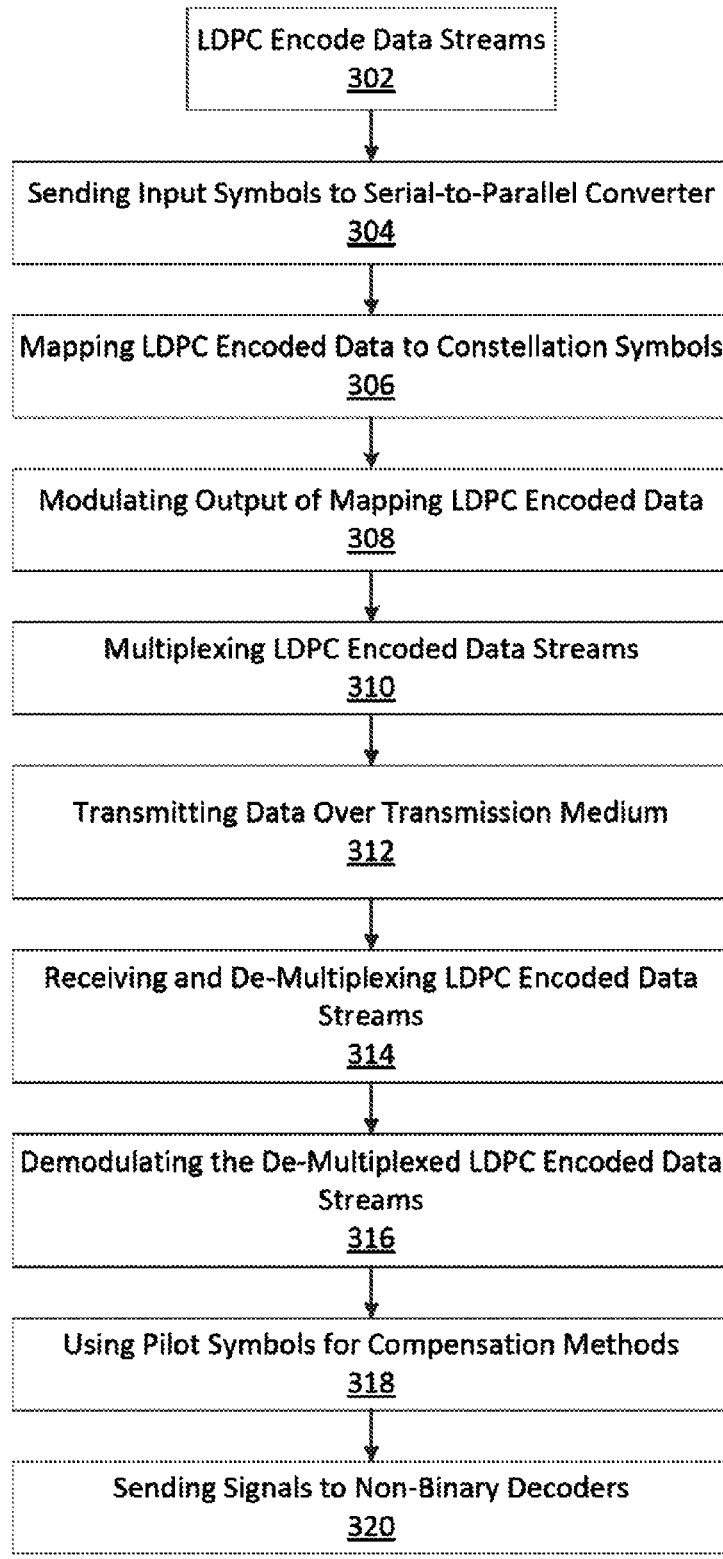
FIG. 3 is a flow diagram illustrating a system/method for transmitting and receiving data that employs non-binary low-density parity-check (NB-LDPC) mode-multiplexed four-dimensional signaling based on orthogonal frequency division multiplexing (OFDM) in accordance with the present principles.

Referring now to FIG. 3, systems/methods for transmitting and receiving data that employs non-binary low-density parity-check (NB-LDPC) mode-multiplexed four-dimensional signaling based on orthogonal frequency division multiplexing (OFDM) is illustratively depicted in accordance with the present principles. These systems/methods provide for very high transmission rates (e.g., multi Tb/s) and excellent net coding gains. In one embodiment, a plurality of data streams may be encoded in block 302 using NB-LDPC coded modulation, and the input symbols may then be sent to one or more serial-to-parallel (S/P) converters in block 304. The encoded streams may be mapped to the symbols of an I/Q constellation using one or more mappers in block 306, and may be modulated using the modulator in block 308. It is noted that the mapper 306 may be four-dimensional. The encoded streams may be first polarization-division multiplexed followed by mode-division multiplexing in block 310 before transmission over fiber in block 312.

In one embodiment, the multiplexed symbols may be received and demultiplexed in block 314 (e.g., first mode-division demultiplexed followed by polarization diversity coherent detection), and may be demodulated in block 316. Pilot may be inserted on the transmitter side, and may be used in LS and LMMSE-based compensation methods using a compensation module, including a processor, in block 318, and the symbols may then be passed to one or more non-binary decoders in block 320. It is noted that although the above configuration is illustratively shown, it is contemplated that other sorts of configurations may also be employed in accordance with the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for data transport, comprising:
encoding one or more streams of input data using at least two nonbinary low density parity check (NB-LDPC) encoders;
generating one or more NB-LDPC coded four-dimensional (4-D) optimum signal constellations;
performing orthogonal frequency division multiplexing (OFDM) on the NB-LDPC coded 4D optimum signal constellations, wherein two OFDM transmitters are employed for each of the 4D optimum signal constellations,
wherein a first two coordinates are allocated to a first OFDM transmitter, and a second two coordinates are allocated to a second OFDM transmitter to create one or more OFDM symbols, and
wherein pilot tones are inserted into all subcarriers of the OFDM symbols for a specific insertion period for channel estimation;
representing channel coefficients of the subcarriers for a minimum mean square error (MMSE), denoted as $\hat{H}_{p,LMMSE}$, estimator with:

$$\hat{H}_{p,LMMSE} = R_{H_p,H_p}\left(R_{H_p,H_p} + \frac{\xi}{SNR_p}I\right)^{-1} \hat{H}_{p,LS},$$

where $\hat{H}_{p,LS}$ is the least-square estimate of $H_p$, determined with:

$$\hat{H}_{p,LS} = [H_{p,LS}(0), H_{p,LS}(1), \ldots H_{p,LS}(N_p - 1)]^T =$$
$$\left[\frac{Y_p(0)}{X_p(0)}, \frac{Y_p(1)}{X_p(1)}, \ldots, \frac{Y_p(N_p - 1)}{X_p(N_p - 1)}\right]^T,$$

where $X_p(i)$ and $Y_p(i)$ are transmitted and received symbols of pilot i(i=0,1, ..., $N_p$–1), p denotes pilot, SNR=$E\{|X_p(k)|^2\}/\sigma_n^2$ denotes a signal-to-noise ratio (SNR) for each mode estimated after compensation, and
$\xi = E\{|X_p(k)|^2\}E\{|1/X_p(k)|^2\}$ is a constant dependent on a signal constellation,
while a covariance matrix is defined as $R_{H_p, H_p} = E\{H_p H_p^H\}$, where E denotes an expectation operator and H denotes a Hermitian transposition operation;
generating one or more signals using two or more mappers, the mappers configured to assign bits of one or more signals to the signal constellations and to associate the bits of the one or more signals with signal constellation points;
modulating the output of the 4-D mappers using a 4-D OFDM transmitter and a 4-D modulator onto a transmission medium using block coded-modulation, and transmitting modulated output of the mappers using the transmission medium; and
mode-multiplexing independent 4-D OFDM data streams onto fiber.

2. The method as recited in claim 1, further comprising:
receiving, mode-demultiplexing, and demodulating the transmitted modulated output using a plurality of polarization diversity receivers, one per spatial mode;

performing channel estimation and compensation methods to overcome linear and non-linear impairments in the transmission medium; and decoding received data using one or more non-binary decoders.

3. The method as recited in claim 1, wherein either two 2-D OFDM transmitters or one 4-D OFDM transmitter are employed for each of the 4D optimum signal constellations.

4. The method as recited in claim 1, wherein training symbols and pilots are inserted into the OFDM symbols for channel estimation.

5. The method as recited in claim 1, wherein the NB-LDPC coded optimum signal constellations are mode-multiplexed.

6. The method as recited in claim 1, comprising performing linear minimum mean square error (LMMSE)-based compensation of mode coupling.

7. A system for transmitting data, comprising:
two or more nonbinary low density parity check (NB-LDPC) encoders configured to encode one or more streams of input data;
one or more orthogonal frequency division multiplexers configured to perform orthogonal frequency division multiplexing (OFDM) on one or more NB-LDPC coded four-dimensional (4-D) optimum signal constellations, the orthogonal frequency division multiplexers comprising:
two or more mappers configured to generate one or more signals, assign bits of the one or more signals to the one or more NB-LDPC coded 4-D optimum signal constellations, and associate the bits of the one or more signals with signal constellation points; and
one or more 4-D modulators configured to modulate output of the two or more mappers by a 4-D OFDM transmitter and a 4-D modulator onto a transmission medium using block coded-modulation, and to transmit the modulated output of the two or more mappers using the transmission medium, wherein two OFDM transmitters are employed for each of the 4D optimum signal constellations,
wherein a first two coordinates are allocated to a first OFDM transmitter, and a second two coordinates are allocated to a second OFDM transmitter to create one or more OFDM symbols, and
wherein pilot tones are inserted into all subcarriers of the OFDM symbols for a specific insertion period for channel estimation;
representing channel coefficients of the subcarriers for a minimum mean square error (MMSE), denoted as $\hat{H}_{p,LMMSE}$, estimator with:

$$\hat{H}_{p,LMMSE} = R_{H_p,H_p}\left(R_{H_p,H_p} + \frac{\xi}{SNR_p}I\right)^{-1}\hat{H}_{p,LS},$$

where $\hat{H}_{p,LS}$ is the least-square estimate of $H_p$, determined with:

$$\hat{H}_{p,LS} = [H_{p,LS}(0), H_{p,LS}(1), \ldots H_{p,LS}(N_p-1)]^T = \left[\frac{Y_p(0)}{X_p(0)}, \frac{Y_p(1)}{X_p(1)}, \ldots, \frac{Y_p(N_p-1)}{X_p(N_p-1)}\right]^T,$$

where $X_p(i)$ and $Y_p(i)$ are transmitted and received symbols of pilot i (i=0,1, . . . , $N_p$−1), p denotes pilot, SNR=$E\{|X_p(k)|^2\}/\sigma_n^2$ denotes a signal-to-noise ratio (SNR) for each mode estimated after compensation, and $\xi=E\{|X_p(k)|^2\}E\{|1/X_p(k)|^2\}$ is a constant dependent on a signal constellation, while a covariance matrix is defined as $R_{H_p,H_p}=E\{H_p H_p^H\}$, where E denotes an expectation operator and H denotes a Hermitian transposition operation.

8. The system as recited in claim 7, wherein either two 2-D OFDM transmitters or one 4-D OFDM transmitter are employed for each of the 4D optimum signal constellations.

9. The system as recited in claim 8, wherein training symbols and pilots are inserted into the OFDM symbols for channel estimation.

10. The system as recited in claim 7, wherein the NB-LDPC coded 4-D optimum signal constellations are mode-multiplexed.

11. A system for receiving data, comprising:
one mode-demultiplexer;
one four-dimensional (4-D) or two two-dimensional (2-D) orthogonal frequency division mode demultiplexers configured to receive and demodulate the signal at the output of mode- demultiplexer;
one 4-D or two 2-D, per mode, orthogonal frequency division multiplexing (OFDM) demodulators per mode, the OFDM demodulators configured to demodulate the received mode- demultiplexer signal;
one or more channel estimators and compensators configured to perform channel estimation and compensation methods to overcome linear and non-linear impairments in the transmission medium using pilots, wherein pilot tones are inserted into all subcarriers of one or more created OFDM symbols for a specific insertion period for the channel estimation;
representing channel coefficients of the subcarriers for a minimum mean square error (MMSE), denoted as $\hat{H}_{p,LMMSE}$, estimator with:

$$\hat{H}_{p,LMMSE} = R_{H_p,H_p}\left(R_{H_p,H_p} + \frac{\xi}{SNR_p}I\right)^{-1}\hat{H}_{p,LS},$$

where $\hat{H}_{p,LS}$ is the least-square estimate of $H_p$, determined with:

$$\hat{H}_{p,LS} = [H_{p,LS}(0), H_{p,LS}(1), \ldots H_{p,LS}(N_p-1)]^T = \left[\frac{Y_p(0)}{X_p(0)}, \frac{Y_p(1)}{X_p(1)}, \ldots, \frac{Y_p(N_p-1)}{X_p(N_p-1)}\right]^T,$$

where $X_p(i)$ and $Y_p(i)$ are transmitted and received symbols of pilot i (i=0,1, . . . , $N_p$−1), p denotes pilot, SNR=$E\{|X_p(k)|^2\}/\sigma_n^2$ denotes a signal-to-noise ratio (SNR) for each mode estimated after compensation, and $\xi=E\{|X_p(k)|^2\}E\{|1/X_p(k)|^2\}$ is a constant dependent on a signal constellation, while a covariance matrix is defined as $R_{H_p,H_p}=E\{H_p H_p^H\}$, where E denotes an expectation operator and H denotes a Hermitian transposition operation; and two or more non-binary decoders configured to decode received data.

12. The system as recited in claim 11, wherein the one or more demodulators are 4-D OFDM demodulators.

13. The system as recited in claim 11, wherein two OFDM receivers are employed for each of one or more 4D signal constellations.

14. The system as recited in claim 11, wherein the channel estimation and compensation methods include linear minimum mean square error (LMMSE)-based compensation of mode coupling.

* * * * *